US012429204B2

(12) United States Patent
Lang et al.

(10) Patent No.: US 12,429,204 B2
(45) Date of Patent: Sep. 30, 2025

(54) OPTICAL PLATE WITH INTEGRATED CONNECTION

(71) Applicant: Schreder S.A., Brussels (BE)

(72) Inventors: Vincent Lang, Liege (BE); Paul Smets, Liege (BE); John Witczak, Liege (BE)

(73) Assignee: Schreder S.A., Brussels (BE)

( * ) Notice: Subject to any disclaimer, the term of this patent is extended or adjusted under 35 U.S.C. 154(b) by 0 days.

(21) Appl. No.: 18/685,757

(22) PCT Filed: Aug. 23, 2022

(86) PCT No.: PCT/EP2022/073519
§ 371 (c)(1),
(2) Date: Feb. 22, 2024

(87) PCT Pub. No.: WO2023/025822
PCT Pub. Date: Mar. 2, 2023

(65) Prior Publication Data

US 2025/0129924 A1 Apr. 24, 2025

(30) Foreign Application Priority Data

Aug. 23, 2021 (NL) ..................................... 2029021

(51) Int. Cl.
*F21V 23/06* (2006.01)
*F21V 5/00* (2018.01)
(Continued)

(52) U.S. Cl.
CPC .............. *F21V 23/06* (2013.01); *F21V 5/007* (2013.01); *F21V 17/06* (2013.01); *F21V 31/005* (2013.01); *F21Y 2115/10* (2016.08)

(58) Field of Classification Search
CPC .......... F21V 23/06; F21V 5/007; F21V 17/06; F21V 31/005; F21Y 2115/10
See application file for complete search history.

(56) References Cited

U.S. PATENT DOCUMENTS 10,386,051 B2 * 8/2019 Chen .................. F21V 23/0457
10,816,165 B2 * 10/2020 McCracken, Jr. ...... F21V 13/04
(Continued)

FOREIGN PATENT DOCUMENTS

DE 19927142 C1 12/2000
EP 3128231 A1 2/2017
(Continued)

OTHER PUBLICATIONS

PCT International Search Report and Written Opinion, Application No. PCT/EP2022/073519, mailed Jan. 10, 2023, 11 pages.

*Primary Examiner* — Tsion Tumebo
(74) *Attorney, Agent, or Firm* — McDonnell Boehnen Hulbert & Berghoff LLP

(57) ABSTRACT

Example embodiments relate to optical plates with integrated connections. One example lighting unit includes a substrate. The lighting unit also includes one or more light sources provided to a top surface of the substrate. Additionally, the lighting unit includes at least one electrical contact provided to the top surface of the substrate. Further, the lighting unit includes an optical plate having an inner surface and an outer surface. The optical plate includes one or more optical elements. The one or more optical elements are configured for cooperating with the one or more light sources. The inner surface of the optical plate faces the top surface of the substrate. The optical plate further includes at least one electrical connecting element. The at least one electrical connecting element is configured for being connected electrically to the at least one electrical contact, and for providing electrical connection through the optical plate.

19 Claims, 3 Drawing Sheets

(51) Int. Cl.

| | |
|---|---|
| ***F21V 17/06*** | (2006.01) |
| ***F21V 31/00*** | (2006.01) |
| ***F21Y 115/10*** | (2016.01) |

(56) References Cited

U.S. PATENT DOCUMENTS

| | | | | |
|---|---|---|---|---|
| 2016/0215955 | A1* | 7/2016 | Donato | F21V 5/007 |
| 2017/0038056 | A1* | 2/2017 | Joiris | F21K 9/69 |
| 2022/0057071 | A1* | 2/2022 | Smets | F21V 17/02 |

FOREIGN PATENT DOCUMENTS

| | | | |
|---|---|---|---|
| JP | 2017138566 | A | 8/2017 |
| WO | 8905524 | A1 | 6/1989 |
| WO | 2015140017 | A1 | 9/2015 |
| WO | 2019015976 | A1 | 1/2019 |

* cited by examiner

OPTICAL PLATE WITH INTEGRATED CONNECTION

CROSS-REFERENCE TO RELATED APPLICATIONS

The present application is a national stage entry of PCT/EP2022/073519 filed Aug. 23, 2022, which claims priority to NL 2029021 filed Aug. 23, 2021, the contents of each of which are hereby incorporated by reference.

TECHNICAL FIELD

The field of the invention relates to lighting units, and optical plates, especially for outdoor luminaires. Particular embodiments relate to optical plates with integrated connections to be assembled in lighting units.

BACKGROUND

In existing lighting units including a substrate with an integrated circuit, input cabling or power cabling is generally provided through wires soldered to the integrated circuit. By soldering, a heterogenous ensemble of materials is brought together. This ensemble, due to its heterogenous nature, is prone to the appearance of cracks with age, physical shocks, and vibrations, which turns into an interruption in the power provided to the integrated circuit, for example, and a failure of the lighting unit. Additionally, when being used in challenging environmental conditions, lighting units are normally provided with protection against the ingress of dust and water. Insuring sealing of the lighting units is usually challenging at interfaces of sensitive elements of the lighting units. The sealing at the level of the power cabling has to be carefully considered and flexible wires used for input cabling or power cabling result in liabilities in the sealing.

EP3128231 in the name of the applicant discloses an LED module comprising a PCBA having an array of LED elements, a secondary lens array and a lens holder. The secondary lens array has a peripheral lip and a plurality of boss portions which are compressed between the lens holder and the PCBA to form water-tight gaskets. The secondary lens array also forms gaskets around wires connecting with terminal blocks on the PCBA and effectively seals with a base plate on which the PCBA is mounted.

However, such wires may need to be carefully handled in order to provide an electrical connection.

In prior art solutions, through-holes at physical interfaces are used to pass wires through. These through-holes are provided with grommets to ensure sealing and soldering is performed to achieve electrical contact between the cabling and an integrated circuit. However, such methods of achieving electrical contact and sealing are cumbersome since they require a number of manipulations for an operator. There is thus a need for an optical plate assembled in a lighting unit providing for convenient electrical connection.

SUMMARY

The object of embodiments of the invention is to provide a lighting unit and an optical plate for a lighting unit allowing improvements in the reliability, user-friendliness, and safety of electrical connections.

According to a first aspect of the invention, there is provided a lighting unit. The lighting unit comprises: a substrate; one or more light sources; at least one electrical contact; an optical plate. The one or more light sources, preferably one or more LEDs, are provided to a top surface of the substrate. The at least one electrical contact is provided to the top surface of said substrate, and preferably one of said at least one electrical contact is electrically connected to the one or more light sources. The optical plate has an inner surface and an outer surface. The optical plate comprises one or more optical elements, said one or more optical elements configured for cooperating with the one or more light sources in order to shape the light emitted by the one or more light sources. The inner surface of the optical plate faces the top surface of the substrate. The optical plate further comprises at least one electrical connecting element integrated to the optical plate. The at least one electrical connecting element is configured for, when the optical plate is mounted over the substrate, being connected electrically to the at least one electrical contact, and for providing electrical connection through the optical plate between the inner surface and the outer surface.

By having the at least one electrical connecting element going through the optical plate, a convenient means for electrical connection is provided to the lighting unit via the optical plate. The at least one electrical connecting element may be integrated to the optical plate by being embedded in it.

To ensure electrical connection on the substrate, an extremity of the at least one electrical connecting element facing the at least one electrical contact may be bare. Arranging the optical plate with respect to the substrate in a predetermined position, e.g. using alignment guides of the optical plate relative to the substrate, allows for the at least one electrical contact and the at least one electrical connecting element to be electrically connected. An electrical access is therefore established between the substrate and a point outside of the optical plate. Also, due to the integration of the at least one electrical connecting element to the optical plate, motions of the at least one electrical connecting element relative to the at least one electrical contact are restrained and reliability of the electrical connection obtained is improved.

Depending on embodiments, the at least one electrical connecting element is configured for providing power input means, power output means, data input means, and/or data output means.

Additionally, the optical plate may be provided with alignment guides for its assembly with the substrate. These alignment guides also allow for an increased accuracy in establishing the electrical connection between the at least one electrical connecting element and the at least one electrical contact.

In a preferred embodiment, the substrate, e.g. a PCB, is provided with one or more electrical traces; the at least one electrical contact is electrically connected to the one or more traces, preferably such as to electrically connect one of the at least one electrical contact to the one or more light sources. One of the at least one electrical contact may be connected to the one or more light sources in order to carry power to the one or more light sources.

Preferably, the lighting unit is a lighting unit of an outdoor or industrial luminaire. By outdoor or industrial luminaire, it is meant luminaires which are installed among roads, tunnels, industrial plants, stadiums, airports, harbors, rail stations, campuses, parks, cycle paths, pedestrian paths or in pedestrian zones, for example, and which can be used notably for the lighting of an outdoor area or large indoor area, such as roads and residential areas in the public domain, private parking areas and access roads to private building infrastructures, warehouses, industry halls, etc.

According to a preferred embodiment, the optical plate is configured for being mounted on the substrate such as to define at least one sealed cavity between the inner surface of the optical plate and the top surface of the substrate. The at least one electrical contact is in the at least one sealed cavity.

Preferably, a seal is provided at the interface between the optical plate and the substrate and arranged around the at least one sealed cavity such as to seal the at least one sealed cavity. In an embodiment, the seal has a cylindrical cross-section and may be provided by overmolding or injection to the optical plate.

In another preferential embodiment, the inner surface of the optical plate facing the top surface of the substrate comprises a material with sealing properties around the at least one sealed cavity, e.g. a flexible material such as silicone. For example, the whole optical plate may be made of a material with sealing properties, e.g. a flexible material such as silicone. In another example, only a portion of the optical plate configured to be in contact with the top surface of the substrate and surrounding the at least one sealed cavity may be made of a material with sealing properties. Such optical plate may be fixed using any type of fixation means, e.g. using a frame or optical plate holder which is mounted over the optical plate and fixed to the substrate, e.g. with screws or bolts or clips. The fixation means are preferably such that the material with sealing properties is pressed against the substrate. Exemplary embodiments thereof are disclosed in European patent EP3128231B1 in the name of the applicant, which is included herein by reference.

In this manner, the overall electrical connection of the substrate is protected against ingress of water or dust. Thus, the electrical safety of the lighting unit is improved.

In an embodiment, there may be a single common sealed cavity in which the one or more light sources and the at least one electrical contact are located. In another embodiment, there may be a plurality of sealed cavities for the one or more light sources and the at least one electrical contact respectively, and the at least one electrical contact is located in at least one sealed cavity of the plurality of sealed cavities distinct from another sealed cavity of the plurality of sealed cavities configured for the one or more light sources. In yet another embodiment, there may be a plurality of electrical contacts, said plurality of electrical contacts configured for different types of inputs/outputs, e.g. power input, power output, data input, data output, and there may be a sealed cavity defined for each of the different types of inputs/outputs.

To seal the sealed cavity, the optical plate may have a seal recess surrounding the at least one sealed cavity. A loop seal may be provided to the seal recess. Preferably, the seal recess is configured for, when the optical plate is mounted over the substrate, surrounding both an area where the one or more light sources are provided and an area where the at least one electrical contact is provided on the substrate in order to utilize only a single loop seal.

An optical plate holder may be provided to the lighting unit. The optical plate holder may be mountable to the substrate and configured for retaining the optical plate in position with respect to the one or more light sources. The optical plate may be molded as a single component and may comprise a material with sealing properties such as an optical grade silicone material. Optionally, the top surface of the substrate has a plurality of mounting apertures formed therein and/or positioning apertures provided thereon. Optionally, one of the optical plate and the optical plate holder may comprise positioning pins configured for engaging positioning apertures of the substrate for retaining each of the one or more optical elements in alignment with the associated one or more light sources and for maintaining the optical plate at a predetermined distance from the top surface of the substrate. The optical plate holder may comprise at least one clip formed on a surface thereof, each clip being configured for engaging an associated mounting aperture formed in the substrate when mounted thereon. Examples of use of an optical plate holder are disclosed in patent EP2966346 B1 in the name of the applicant, which are included herein by reference.

According to an exemplary embodiment, the outer surface of the optical plate comprises a lateral surface and an upper surface. The at least one electrical connecting element is configured for providing electrical connection between the inner surface and the lateral surface of the optical plate.

In this way, the at least one electrical connecting element can be reached in a sideway manner. This can be more convenient to organize multiple interconnected electrical components in a plane.

Preferably, the lateral surface is substantially perpendicular to the upper surface, and the upper surface is substantially parallel to the substrate.

According to a preferred embodiment, the at least one electrical contact comprises a spring portion, preferably connected electrically to the one or more light sources.

In this manner, the electrical connection between the at least one electrical contact and the at least one electrical connecting element can be maintained despite shocks or vibrations. Preferably, the spring portion comprises a spring blade.

In another embodiment, the at least one electrical contact comprises a female-type contact configured to cooperate with a male-type portion of the at least one electrical connecting element. In yet another embodiment, the at least one electrical contact comprises a male-type portion configured to cooperate with a female-type contact of the at least one electrical connecting element.

According to an exemplary embodiment, the at least one electrical connecting element comprises at least one pad portion configured for being connected to the at least one electrical contact.

Preferably, the at least one pad portion is provided at an extremity of the at least one electrical connecting element. Additionally, the at least one pad portion is substantially parallel to the substrate.

In this way, a surface area of electrical connection between the at least one electrical connecting element and the at least one electrical contact is increased. This, in turn, improves the reliability of the electrical connection and decreases risks of disconnection due to shocks or vibrations.

According to a preferred embodiment, the at least one electrical connecting element comprises at least one self-standing pin portion.

Preferably, the at least one self-standing pin portion is located on the outer surface side of the optical plate.

In this manner, the at least one electrical connecting element is provided with a portion having some rigidity which renders electrical connection to it easier and more user-friendly.

According to an exemplary embodiment, the outer surface of the optical plate comprises a recess surrounding the at least one electrical connecting element, said recess defining a receptacle configured for receiving a cooperating electrical connector.

Preferably, the recess is located on the lateral surface of the optical plate.

In this way, the recess can serve as protection for the at least one electrical connecting element on the outer surface side.

Additionally, when receiving the cooperating electrical connector, the recess may be configured for retaining the cooperating electrical connector by friction. It is also to be noted that, using the cooperating electrical connector and inserting it into the recess, the electrical connection established gains protection against ingress of water or dust.

According to a preferred embodiment, the recess is provided with a retaining means configured for retaining the electrical connector in electrical connection with the at least one electrical connecting element.

In this manner, reliability of the electrical connection at the level of the electrical connector and the at least one electrical connecting element is improved. Depending on embodiments, the retaining means may be any one of: a mechanical retaining means, a chemical retaining means, a magnetic retaining means.

Preferably, the retaining means is a mechanical retaining means configured for cooperating with a complementary mechanical retaining means of the electrical connector.

According to an exemplary embodiment, the retaining means is integrated to the optical plate.

In this way, the number of pieces to implement the optical plate is reduced. In an embodiment, the electrical connector comprises a snap-fit portion configured to cooperate with a corresponding cavity on an external surface defining the recess.

It is to be noted that implementing the above relative to the recess allows forming an integrated plug with lesser elements, in a simpler manner, and ensuring better tightness compared to the generally known solution of attaching an independent plug connector to the optical plate.

According to a preferred embodiment, the lighting unit further comprises a seal arranged on the outer surface of the optical plate and surrounding the recess such as to provide sealing at the interface between the electrical connector and the outer surface upon plugging the electrical connector to the recess.

In this manner, the sealing at the level of the electrical connector and the at least one electrical connecting element is improved. Preferably, the seal surrounding the recess comprises a loop seal.

Additionally or alternatively, a material of the optical plate surrounding the recess has sealing properties.

According to an exemplary embodiment, the at least one connecting element is configured for providing electrical connection at a periphery of the optical plate with respect to the outer surface.

In this way, connectivity is made more convenient. Also, having a peripheral electrical connection allows to reduce the impact of the electrical connection on the overall optical function of the optical plate.

According to a preferred embodiment, the at least one connecting element comprises at least two connecting lines, more preferably a pair of connecting lines.

Preferably, the at least two connecting lines are for power input to provide power to the one or more light sources.

Each of the connecting lines may comprise a pin portion, i.e. a self-standing portion of bare material. In an embodiment, the at least two connecting lines are a pair of connecting lines surrounded by a single recess defining a receptacle on a peripheral outer surface portion of the optical plate. In another embodiment, the optical plate may be provided with a plurality of recesses on different peripheral sides of the optical plate, said plurality of recesses defining receptacles for a plurality of electrical connecting elements.

According to an exemplary embodiment, an optical plate portion through which the at least one electrical connecting element goes through is made of an electrically-insulating material.

Preferably, the optical plate, apart from the at least one electrical connecting element, is entirely made of the electrically-insulating material, e.g. PMMA, PC.

In this manner, the electrical safety of the optical plate is ensured.

According to a preferred embodiment, a bare conducting portion of the at least one connecting element is directly embedded within the optical plate portion.

In this way, the overall fabrication process of the optical plate is simplified.

According to an exemplary embodiment, the at least one electrical connecting element is integrated to the optical plate by overmolding.

In this manner, the number of steps in the fabrication process of the optical plate is reduced. In a preferential embodiment, overmolding involves for the at least one electrical connecting element to be held in a predetermined position in the mold before injection of a material part of the optical plate. The injected material in the mold will then surround the at least one electrical connecting element in order to fix the predetermined position of the at least one electrical connecting element with respect to the optical plate. By this fabrication method, a good sealing is obtained around the at least one electrical connecting element by the injected material. Additionally, a final position of the at least one electrical connecting element relative to the optical plate is obtained with great precision, making up for good alignment when being later used for connection.

This fabrication method distinguishes itself from the typical method of piercing a hole through the optical plate, placing the at least one electrical connecting element, and using an adhesive to fix the at least one electrical connecting element within the pierced hole. Indeed, such a typical method requires more steps, is more difficult/less reliable, and provides for a less precise positioning of the at least one electrical connecting element.

According to a preferred embodiment, the one or more optical elements comprise one or more lens elements, preferably one or more free-form lens elements.

According to an exemplary embodiment, the one or more optical elements are forming an array of at least two rows and at least two columns.

According to a preferred embodiment, the one or more light sources are forming an array of at least two rows and at least two columns.

According to an exemplary embodiment, each of the one or more optical elements is configured to correspond to one light source of the one or more light sources.

The one or more light sources are provided to the top surface of the substrate, preferably a printed circuit board (PCB). The substrate may be shaped as a rectangular plate or may have any other suitable shape. The one or more light sources may be arranged without a determined pattern or may describe an array, e.g. an array of a plurality of rows by a plurality of columns, such as a two by two array. The size of the array may be designed depending on the intended use of the lighting unit and on the intended shape and size of the optical plate. The one or more light sources may be one or more LEDs. The one or more light sources could also be light sources other than LEDs, e.g. halogen, incandescent, or fluorescent lamps. A light source of the one or more light sources may comprise several light elements, e.g. a LED may consist in a multi-chip of LEDs. The surface onto which the one or more light sources is provided can be made reflective or white to improve the light emission.

The one or more light sources provided to the substrate may also comprise one or more light elements configured to emit light sideways. One or more optical elements may be provided to the one or more light sources, said one or more optical elements being provided each with at least one surface configured to reflect light rays and oriented so that the sideways light rays are reflected away from the substrate at an angle of at least 30°. Examples of light assembly are disclosed in patent application NL2032294 in the name of the applicant, which are included herein by reference.

One or more optical elements may be provided to the one or more light sources via the optical plate such that each of the one or more light sources is provided with a corresponding optical element. In an exemplary embodiment, the one or more optical elements are one or more lens elements which are similar in size and shape and there is one optical element for each light source. In another exemplary embodiment, some or all of the one or more optical elements may be different from each other. In still another embodiment, a plurality of light sources may be provided with a plurality of different optical elements or additional optical elements, e.g. refractive elements, diffusive elements, reflective elements, additional lenses, collimating elements, filtering elements. In a particular embodiment, one optical element may cover several light sources of a plurality of light sources.

The lens element may be free form in the sense that it is not rotation symmetrical. In a preferred embodiment, lens elements have a symmetry plate substantially perpendicular to the optical plate. The lens element comprises a first surface and a second surface located on opposite sides. The second surface faces the one or more light sources. The first surface may be a convex surface. The second surface may be a concave surface, but may also be a planar surface. The lens element may have a maximum length different from a maximum width. The one or more lens elements of the optical plate may be in a transparent or translucent material. They may be in optical grade silicone, glass, poly(methyl methacrylate) (PMMA), polycarbonate (PC), or polyethylene terephthalate (PET).

More generally the one or more optical elements may comprise any one of the following: a lens module, a reflector module, a backlight module, a prism module, a collimator module, a diffusor module, a light shielding structure, and the like. Also, an optical element may be combining multiple optical functions, e.g. a lens and a reflector function, or a collimator and a reflector function. The one or more optical elements may be the same or different and may optionally be arranged within a frame. This will allow combining different optical functions in the same frame in a modular manner. Alternatively or additionally, at least some of the optical elements may be directly fixed on the substrate. For example, a first subset of light sources of a luminaire may be provided with a first set of optical elements of a first type, and a second subset of light sources may be provided with a second set of optical elements of a second type. This allows choosing suitable optical elements in function of the position of the light sources in the luminaire system. For example, light sources near the periphery of the support structure may be provided with a different optical element compared to light sources provided in the center of the support structure, and/or light sources near the luminaire pole may be provided with a different optical element compared to light sources provided near a front end of a luminaire head.

The one or more optical elements may also comprise one or more light shielding structures complying with a certain glare classification, e.g. the G classification defined according to the CIE115: 2010 standard and the G* classification defined according to the EN13201-2 standard. The light shielding structures may be configured for reducing a solid angle of light beams of the plurality of light sources by cutting off or reflecting light rays having a large incident angle, thereby reducing the light intensities at large angles and improving the G/G* classification of the luminaire system. Examples of light shielding structure are disclosed in patent applications PCT/EP2020/066221 and PCT/EP2019/074894, PCT/EP2021/057135 in the name of the applicant, which are included herein by reference.

Also, in order to reduce glare, a spacer element could be provided between the frame to which the one or more optical elements are welded and a support, such as a PCB, carrying the light sources. An example of a suitable spacer is disclosed in NL2025166.

In the context of the invention, a lens element of the optical element may include any transmissive optical element that focuses or disperses light by means of refraction. It may also include any one of the following: a reflective portion, a backlight portion, a prismatic portion, a collimator portion, a diffusor portion. For example, a lens element may have a lens portion with a concave or convex surface for facing a light source, or more generally a lens portion with a flat or curved surface facing the light source, and optionally a collimator portion integrally formed with said lens portion, said collimator portion being configured for collimating light transmitted through said lens portion. Also, a lens element may be provided with a reflective portion or surface, referred to as a backlight element in the context of the invention, or with a diffusive portion. Examples of a lens element in combination with a reflective element are disclosed in patent application WO2019/215265 A1 in the name of the applicant, which are included herein by reference. Examples of combinations of lens elements to allow different light patterns are disclosed in patent application NL2031825 in the name of the applicant, which are included herein by reference. Examples of how to fasten an optical plate comprising the one or more optical elements to the substrate using fastening means are disclosed in patent application WO 2020/136205 A1 in the name of the applicant, which are included herein by reference.

A lens element may comprise a lens portion having an outer surface and an inner surface intended to face an associated light source. The outer surface may be a convex surface and the inner surface may be a concave or planar surface. Also, a lens element may comprise multiple lens portions adjoined in a discontinuous manner, wherein each lens portion may have a convex outer surface and a concave inner surface.

The one or more optical elements, for example the one or more lens elements, may be part of an integrally formed optical plate, such as a lens plate. In other words, the one or more lens elements may be interconnected as to form a lens plate comprising the one or more lens elements. The lens plate may be formed, e.g. by injection molding, casting, transfer molding, or in another appropriate manner. Alternatively, the optical element, such as the lens elements may be separately formed, e.g. by any one of the above mentioned techniques, and provided to a frame. Examples of optical elements assembly method are disclosed in patent application PCT/EP2021/071200 in the name of the applicant, which is included herein by reference.

Exemplary embodiments of the optical plate including the one or more optical elements may be included in a cover module as described in WO 2020/074229 A1, or may be an integral part of a cover module as described in WO 2020/074229 A1, which is included herein by reference.

Exemplary embodiments of the optical plate including the one or more optical elements may have one or more optical elements with a deformable part, e.g. a deformable lens element as described in PCT application WO 2020/025427 A1 in the name of the applicant, which is included herein by reference. The optical plate may then be provided with a retaining and adjustment means configured to change the shape of the deformable portion whilst an edge portion of the optical plate is retained in a fixed position with respect to the substrate carrying the one or more light sources. By changing the shape of the deformable portion, the light beam emitted through the optical plates can be changed.

Exemplary embodiments of the one or more optical elements may be used in a lighting apparatus as disclosed in WO 2019/020366 A1 in the name of the applicant, which is included herein by reference. More in particular, the driving apparatus may be provided with a drive and control means configured to drive selectively a plurality of groups of LEDs wherein LEDs of the same group are driven simultaneously. LEDs of a same group may be associated with one or more optical modules.

Exemplary embodiments of the one or more optical elements may be used in a luminaire assembly comprising the substrate carrying the one or more light sources, a protector for protecting the one or more light sources from external environmental influences, the protector having a peripheral wall comprising a transparent or translucent portion, wherein the protector is provided with a light absorbing surface arranged inside of the protector and facing the one or more light sources, such that in use part of the light emitted from the one or more light source is absorbed by the light absorbing surface to reduce upward light pollution. An example of such a luminaire assembly is disclosed in patent application WO 2021/116441 in the name of the applicant, which is included herein by reference.

Exemplary embodiments of optical elements may be used in a luminaire system comprising the substrate carrying a plurality of first light sources and a plurality of second light sources, wherein one or more first optical elements is associated with the plurality of first light sources and one or more second optical elements is associated with the plurality of second light sources. The luminaire system may then further comprise a drive and control means configured to drive and control the plurality of first light sources according to a first profile and the plurality of second light sources according to a second profile different from the first profile, wherein the first profile defines a first drive output as a function of time and the second profile defines a second drive output as a function of time. The plurality of first light sources and the first optical elements may be configured to output a first light beam having a first color temperature according to a first intensity distribution within a first solid angle, and the plurality of second light sources and the second optical elements may be configured to output a second light beam having a second color temperature according to a second intensity distribution within a second solid angle, said second intensity distribution being different from the first intensity distribution and/or said first color temperature being different from said second color temperature. Examples of similar luminaire systems are disclosed in patent application WO 2021/130275 in the name of the applicant, which is included herein by reference.

The advantages and features of the embodiments of the above described lighting unit apply mutatis mutandis for embodiments of the below presented optical plate.

According to a second aspect of the invention there is provided an optical plate. The optical plate has an inner surface and an outer surface, and comprises one or more optical elements, said one or more optical elements configured for cooperating with one or more light sources provided to a substrate. An inner surface of the optical plate is configured for facing a top surface of the substrate. The optical plate further comprises at least one electrical connecting element integrated to the optical plate. The at least one electrical connecting element is configured for, when the optical plate is mounted over the substrate, being connected electrically to at least one electrical contact of the top surface of the substrate, and for providing electrical connection through the optical plate between the inner surface and the outer surface.

According to a preferred embodiment, the outer surface of the optical plate comprises a lateral surface and an upper surface, and the at least one electrical connecting element is configured for providing electrical connection between the inner surface and the lateral surface of the optical plate.

According to an exemplary embodiment, the at least one electrical connecting element comprises at least one pad portion.

According to a preferred embodiment, the at least one electrical connecting element comprises at least one self-standing pin portion.

According to an exemplary embodiment, the outer surface of the optical plate comprises a recess surrounding the at least one electrical connecting element, said recess defining a receptacle configured for receiving a cooperating electrical connector.

According to a preferred embodiment, the recess is provided with a retaining means configured for retaining the electrical connector in electrical connection with the at least one electrical connecting element.

According to an exemplary embodiment, the retaining means is integrated to the optical plate.

According to a preferred embodiment, the optical plate further comprises a seal arranged on the outer surface of the optical plate and surrounding the recess such as to provide sealing at the interface between the electrical connector and the outer surface upon plugging the electrical connector to the recess.

According to an exemplary embodiment, the at least one connecting element is configured for providing electrical connection at a periphery of the optical plate with respect to the outer surface.

According to a preferred embodiment, the at least one connecting element comprises at least two connecting lines.

According to an exemplary embodiment, an optical plate portion through which the at least one electrical connecting element goes through is made of an electrically-insulating material.

According to a preferred embodiment, a bare conducting portion of the at least one connecting element is directly embedded within the optical plate portion.

According to an exemplary embodiment, the at least one electrical connecting element is integrated to the optical plate by overmolding.

According to a preferred embodiment, the one or more optical elements comprises one or more lens elements, preferably one or more free-form lens elements.

According to an exemplary embodiment, the one or more optical elements are forming an array of at least two rows and at least two columns.

The advantages and features of the embodiments of the above described lighting unit and optical plate apply mutatis mutandis for embodiments of the below presented system.

According to a third aspect, there is provided a system. The system comprises a lighting unit as described above and a driver configured for driving the one or more light sources of the lighting unit. The driver is connected to the at least one connecting element of the lighting unit such as to supply the one or more light sources.

BRIEF DESCRIPTION OF THE FIGURES

This and other aspects of the present invention will now be described in more detail, with reference to the appended drawings showing a currently preferred embodiment of the invention. Like numbers refer to like features throughout the drawings.

DESCRIPTION OF EMBODIMENTS

Figure 1:
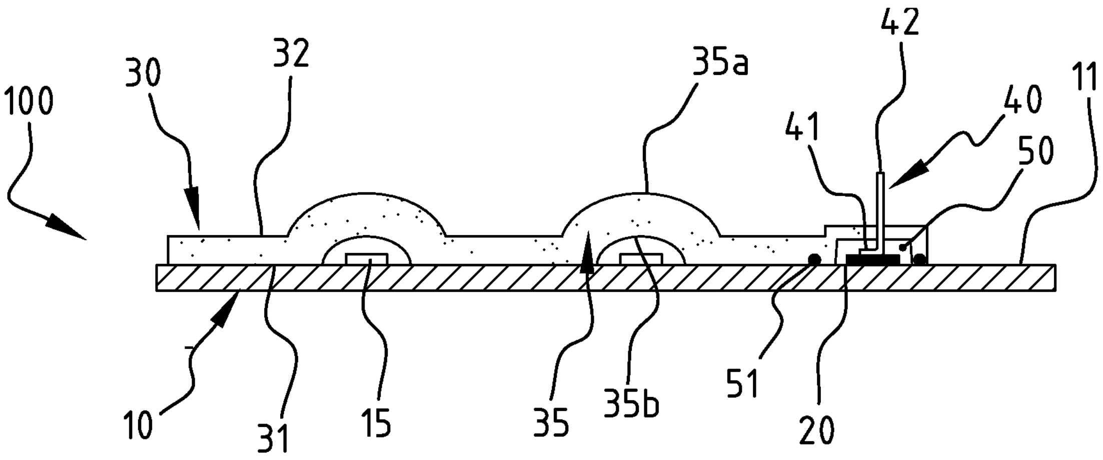
FIG. 1 schematically illustrates a cut side view of an exemplary embodiment a lighting unit.

FIG. 1 schematically illustrates a cut side view of an exemplary embodiment a lighting unit according to the present invention. The lighting unit 100 comprises: a substrate 10; one or more light sources 15; at least one electrical contact 20; and an optical plate 30.

Preferably, the lighting unit 1000 is a lighting unit of an outdoor or industrial luminaire. By outdoor or industrial luminaire, it is meant luminaires which are installed among roads, tunnels, industrial plants, stadiums, airports, harbors, rail stations, campuses, parks, cycle paths, pedestrian paths or in pedestrian zones, for example, and which can be used notably for the lighting of an outdoor area or large indoor area, such as roads and residential areas in the public domain, private parking areas and access roads to private building infrastructures, warehouses, industry halls, etc.

The one or more light sources 15 are provided to a top surface 11 of the substrate 10. The optical plate 30 has an inner surface 31 and an outer surface 32. The optical plate 30 comprises one or more optical elements 35, said one or more optical elements 35 configured for cooperating with the one or more light sources 15. The inner surface 31 of the optical plate faces the top surface 11 of the substrate.

In the embodiment of FIG. 1, the one or more of light sources 15 are provided to the top surface 11 of the substrate, e.g. a printed circuit board (PCB). The substrate 10 may be shaped as a rectangular plate or may have any other suitable shape. The one or more of light sources 15 may be arranged without a determined pattern or may describe an array, e.g. an array of a plurality of rows by a plurality of columns, such as a two by two array. The size of the array may be designed depending on the intended use of the lighting unit 100 and on the intended shape and size of the optical plate 30. The one or more of light sources 15 in FIG. 1 comprise one or more LEDs. In other embodiments, the one or more light sources 15 may also be light sources other than LEDs, e.g. halogen, incandescent, or fluorescent lamps. A light source of the one or more light sources 15 may comprise several light elements, e.g. a LED may consist in a multi-chip of LEDs. The top surface 11 onto which the one or more light sources is provided can be made reflective or white to improve the light emission.

One or more optical elements 35 may be provided to the one or more light sources 15 via the optical plate 30 such that each of the one or more light sources 15 is provided with a corresponding optical element 35. In the embodiment of FIG. 1, the one or more optical elements 35 are one or more lens elements which are similar in size and shape and there is one optical element 35 for each light source 15. In another exemplary embodiment, some or all of the one or more optical elements may be different from each other. In still another embodiment, a plurality of light sources may be provided with a plurality of different optical elements or additional optical elements, e.g. refractive elements, diffusive elements, reflective elements, additional lenses, collimating elements, filtering elements. In a particular embodiment, one optical element may cover several light sources of a plurality of light sources.

The lens element 35 may be free form in the sense that it is not rotation symmetrical. In the embodiment of FIG. 1, lens elements have a symmetry plane, in the plane of the cut, substantially perpendicular to the optical plate 30. The lens element 35 comprises a first surface **35*a* and a second surface 35*b* located on opposite sides. The second surface 35*b* faces the one or more light sources 15. The first surface 35*a* is a convex surface. The second surface 35*b* is a concave surface, but may also be a planar surface. The lens element 35 may have a maximum length different from a maximum width. The one or more lens elements 35** of the optical plate may be in a transparent or translucent material. They may be in optical grade silicone, glass, poly(methyl methacrylate) (PMMA), polycarbonate (PC), or polyethylene terephthalate (PET).

The one or more optical elements 35, for example the one or more lens elements, may be part of an integrally formed optical plate, such as a lens plate in the embodiment of FIG. 1. In other words, the one or more lens elements 35 may be interconnected as to form a lens plate comprising the one or more lens elements 35. The lens plate may be formed, e.g. by injection molding, casting, transfer molding, or in another appropriate manner. Alternatively, the optical elements, such as the lens elements, may be separately formed, e.g. by any one of the above mentioned techniques, and provided to a frame.

The at least one electrical contact 20 is provided to the top surface 11 of the substrate. The optical plate 30 in the embodiment of FIG. 1 is configured for being mounted on the substrate 10 such as to define at least one sealed cavity 50 between the inner surface 31 of the optical plate and the top surface 11 of the substrate. The at least one electrical contact 20 is in the at least one sealed cavity 50. In the embodiment of FIG. 1, there may be a plurality of cavities for the one or more light sources 15 and the at least one electrical contact 20 respectively, and the at least one electrical contact 20 is located in at least one sealed cavity 50 of the plurality of cavities distinct from another cavity of the plurality of sealed cavities configured for the one or more light sources 15.

In an embodiment, there may be a single common sealed cavity in which the one or more light sources and the at least one electrical contact are located. In yet another embodiment, there may be a plurality of electrical contacts, said plurality of electrical contacts configured for different types of inputs/outputs, e.g. power input, power output, data input, data output, and there may be a sealed cavity defined for each of the different types of inputs/outputs.

To seal the at least one sealed cavity 50, the optical plate 30 may have a seal recess (not shown) surrounding the at least one sealed cavity 50. A loop seal 51 may be provided to the seal recess. In the embodiment of FIG. 1, the loop seal 51 surrounds only the at least one sealed cavity 51 where the at least one electrical contact 20 is located. In another embodiment, the seal recess is configured for, when the optical plate is mounted over the substrate, surrounding both an area where the one or more light sources are provided and an area where the at least one electrical contact is provided on the substrate in order to utilize only a single loop seal.

In another preferential embodiment, to seal the at least one sealed cavity, the inner surface of the optical plate facing the top surface of the substrate may comprise a material with sealing properties around the at least one sealed cavity. For example, the whole optical plate may be made of a material with sealing properties. In another example, only a portion of the optical plate configured to be in contact with the top surface of the substrate and surrounding the at least one sealed cavity may be made of a material with sealing properties.

The optical plate 30 further comprises at least one electrical connecting element 40 integrated to the optical plate 30. The at least one electrical connecting element 40 may be integrated to the optical plate 30 by being embedded in it. The at least one electrical connecting element 40 is configured for, when the optical plate 30 is mounted over the substrate 10, being connected electrically to the at least one electrical contact 20, and for providing electrical connection through the optical plate 30 between the inner surface 31 and the outer surface 32. In the embodiment of FIG. 1, the at least one electrical connecting element 40 is provided at the periphery of the optical plate 30.

To ensure electrical connection on the side of the substrate 10, an extremity 41 of the at least one electrical connecting element 40 facing the at least one electrical contact 20 may be bare. Arranging the optical plate 30 with respect to the substrate 10 in a predetermined position allows for the at least one electrical contact 20 and the at least one electrical connecting element 40 to be electrically connected. Depending on embodiments, the at least one electrical connecting element 40 is configured for providing power input means, power output means, data input means, and/or data output means.

Additionally, the optical plate 30 may be provided with alignment guides for its assembly with the substrate 10. These alignment guides also allows for an increased accuracy in establishing the electrical connection between the at least one electrical connecting element 40 and the at least one electrical contact 20.

The at least one electrical contact 20 may comprise a spring portion (not shown), preferably connected electrically to the one or more light sources 15. Preferably, the spring portion comprises a spring blade. The at least one electrical contact 20 in FIG. 1 is then connected to the one or more light sources 15 via electrical traces, e.g. on top of the substrate, in order to carry power to the one or more light sources 15. The at least one connecting element 40 comprises at least two connecting lines (not shown), a pair of connecting lines in FIG. 1 to carry power as a power input means.

In another embodiment, the at least one electrical contact comprises a female-type contact configured to cooperate with a male-type portion of the at least one electrical connecting element. In yet another embodiment, the at least one electrical contact comprises a male-type portion configured to cooperate with a female-type contact of the at least one electrical connecting element.

The at least one electrical connecting element 40 of FIG. 1 comprises at least one pad portion 41 being connected to the at least one electrical contact 20. The at least one pad portion 41 is provided at an extremity of the at least one electrical connecting element 40. Additionally, the at least one pad portion 41 is substantially parallel to the substrate 10. The at least one electrical connecting element 40 of FIG. 1 also comprises at least one self-standing pin portion 42 located at its other extremity, on the outer surface 32 side of the optical plate 30. The at least one self-standing portion 42 extends away from an upper surface of the outer surface 32, substantially perpendicularly relative to the substrate. An female-type electrical connector (not shown) may be provided to connect with the at least one self-standing portion 42. When connected, the female-type electrical connector may abut against the outer surface 32 of the optical plate.

An optical plate portion through which the at least one electrical connecting element 40 goes through is made of an electrically-insulating material. In the embodiment of FIG. 1, the optical plate 30, apart from the at least one electrical connecting element 40, is entirely made of the electrically-insulating material, e.g. PMMA, PC. The at least one connecting element 40 comprises a bare conducting element directly embedded within the optical plate 30 by overmolding.

Figure 2:
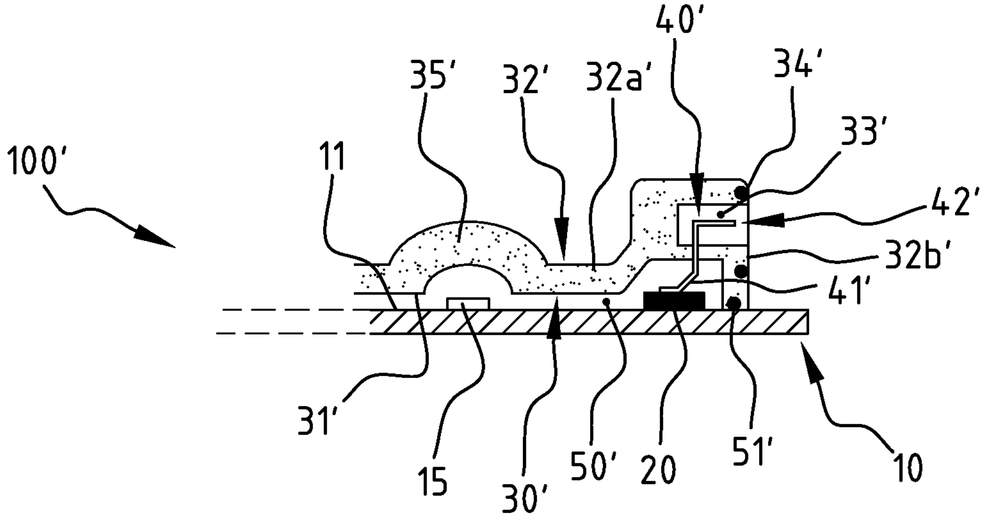
FIG. 2 is a close up cut view of another exemplary embodiment of a lighting unit.

FIG. 2 is a close up cut view of another exemplary embodiment of a lighting unit according to the present invention. More particularly, the view focuses around at least one connecting element 40' included in the lighting unit 100'.

The lighting unit 100' comprises: a substrate 10; one or more light sources 15; at least one electrical contact 20; and an optical plate 30'.

The one or more light sources 15 are provided to a top surface 11 of the substrate 10. The optical plate 30' has an inner surface 31' and an outer surface 32'. The optical plate 30' comprises one or more optical elements 35', said one or more optical elements 35' configured for cooperating with the one or more light sources 15. The inner surface 31' of the optical plate faces the top surface 11 of the substrate. The one or more optical elements 35' and the one or more light sources 15 of FIG. 2 are similar to the one or more optical elements and the one or more light sources in the embodiment of FIG. 1. The optical plate 30' of FIG. 2 is an integrally formed optical plate made of a transparent or translucent material, e.g. PMMA, PC.

The at least one electrical contact 20 is provided to the top surface 11 of the substrate 10. The optical plate 30' in the embodiment of FIG. 2 is configured for being mounted on the substrate 10 such as to define at least one sealed cavity 50' between the inner surface 31 of the optical plate and the top surface 11 of the substrate. The at least one electrical contact 20 is in the at least one sealed cavity 50'. In the embodiment of FIG. 2, there is a single common sealed cavity 50' in which the one or more light sources 15 and the at least one electrical contact 20 are located. To seal the at least one sealed cavity 50', the optical plate 30' may have a seal recess (not shown) surrounding the at least one sealed cavity 50'. A loop seal 51' is provided to the seal recess. The loop seal 51' is configured for, when the optical plate is mounted over the substrate, surrounding both an area where the one or more light sources 15 are provided and an area where the at least one electrical contact 20 is provided on the substrate 10 in order to utilize only a single loop seal.

The optical plate 30 further comprises at least one electrical connecting element 40 integrated to the optical plate 30. The at least one electrical connecting element 40 may be integrated to the optical plate 30 by being embedded in it. The at least one electrical connecting element 40 is configured for, when the optical plate 30 is mounted over the substrate 10, being connected electrically to the at least one electrical contact 20, and for providing electrical connection through the optical plate 30 between the inner surface 31 and the outer surface 32.

To ensure electrical connection on the side of the substrate 10, an extremity of the at least one electrical connecting element 40' facing the at least one electrical contact 20 may be bare and comprise a pad portion 41'. Additionally, the at least one pad portion 41' is substantially parallel to the substrate 10. Depending on embodiments, the at least one electrical connecting element 40' is configured for providing power input means, power output means, data input means, and/or data output means.

The at least one electrical connecting element 40' of FIG. 2 also comprises at least one self-standing pin portion 42' located at its other extremity, on the outer surface 32' side of the optical plate 30'. The outer surface 32' of the optical plate comprises in FIG. 2 a lateral surface **32*a*' and an upper surface 32*b*'. The at least one electrical connecting element 40' is configured for providing electrical connection between the inner surface 31' and the lateral surface 32*a*' of the optical plate. The lateral surface 32*a*' is substantially perpendicular to the upper surface 32*b*', and the upper surface 32*b*' is substantially parallel to the substrate 10**.

The outer surface 32' of the optical plate, the lateral surface **32*a*' in FIG. 2, comprises a recess 33' surrounding the at least one electrical connecting element 40'. The recess 33' defines a receptacle configured for receiving a cooperating electrical connector (not shown). The recess 33'** may be configured for retaining the cooperating electrical connector by friction.

Further, in the embodiment of FIG. 2, the lighting unit 100' comprises a seal 34' arranged on the outer surface 32' of the optical plate, here the lateral surface **32*a*', and surrounding the recess 33' such as to provide sealing at the interface between the electrical connector and the outer surface 32' upon plugging the electrical connector to the recess 33'**. Additionally or alternatively, a material of the optical plate surrounding the recess has sealing properties.

The at least one connecting element 40' extends such as to face the lateral surface **32*a*' of the optical plate in FIG. 2. Therefore, the extremity 42' of the at least one electrical connecting element on the outer surface 32' side extends substantially parallel to the substrate. The at least one connecting element 40' may thus be configured for providing electrical connection at a periphery of the optical plate 30' with respect to the outer surface 32'**.

Figure 3:
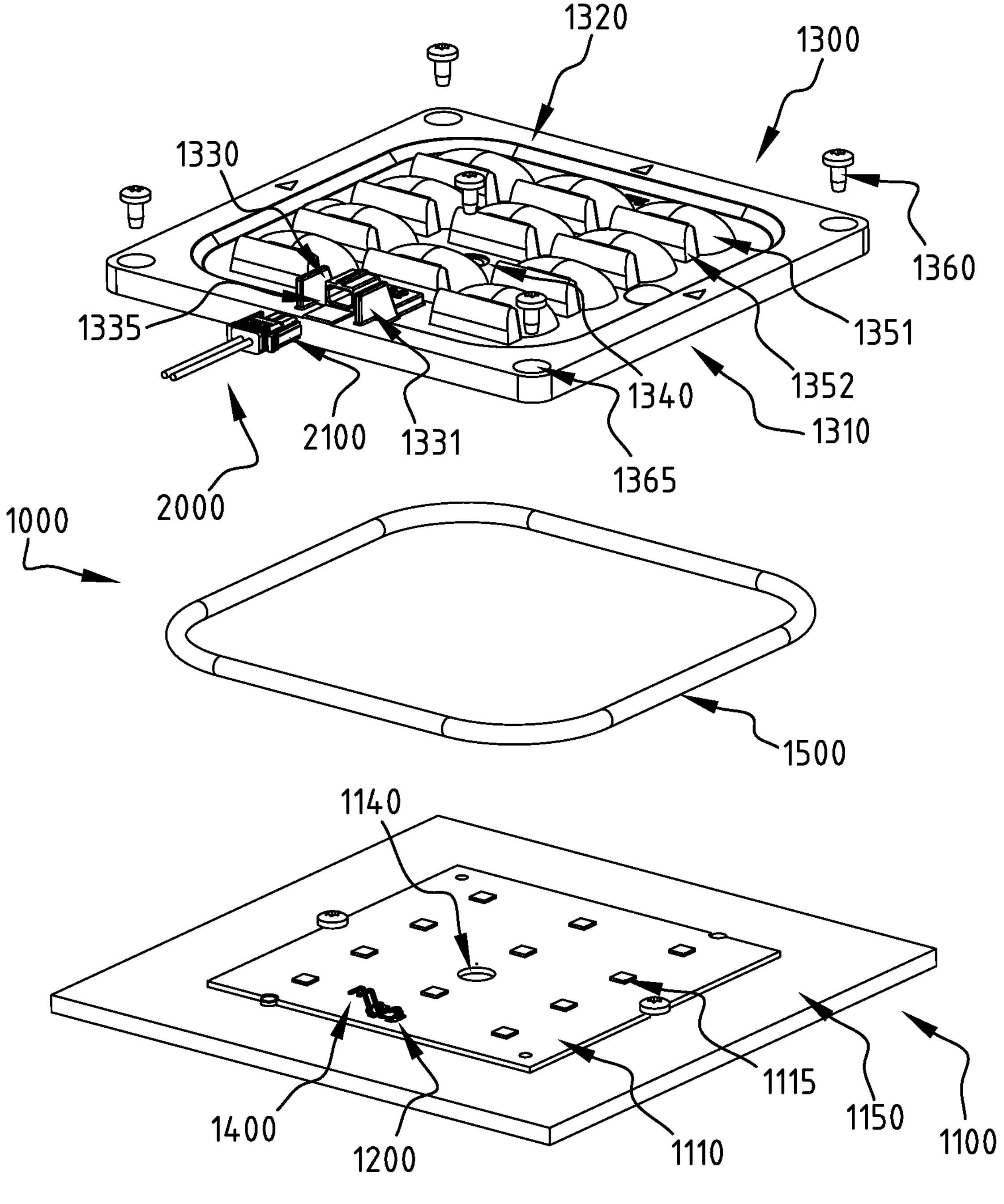
FIG. 3 depicts an exploded perspective view of yet another exemplary embodiment of a lighting unit.

FIG. 3 depicts an exploded perspective view of yet another exemplary embodiment of a lighting unit according to the present invention.

The lighting unit 1000 comprises: a substrate 1100; one or more light sources 1115; at least one electrical contact 1200; and an optical plate 1300. The substrate 1100 in FIG. 3 comprises a PCB 1110 mounted on top of a mounting substrate 1150 in a thermally conductive material, e.g. mounted using a plurality of screws.

The one or more light sources 1115 are provided to a top surface of the PCB 1110. In FIG. 3, the light sources 1115 are organized in three columns of four LEDs, three LEDs, and four LEDs, respectively. The optical plate 1300 has an inner surface 1310 and an outer surface 1320. The optical plate 1300 comprises one or more optical elements 1351, 1352, said one or more optical elements 1351, 1352 configured for cooperating with the one or more light sources 1110. The inner surface 1310 of the optical plate faces the top surface of the substrate 1100. The optical plate 1300 of FIG. 3 is an integrally formed optical plate made of a transparent or translucent material, e.g. PMMA, PC. Each of the plurality of light sources 1115 is provided with a free form lens element 1351 and a backlight element 1352 in the embodiment of FIG. 3.

A seal loop 1500 surrounding the PCB 1110 is arranged at the interface between the optical plate 1300 and the mounting substrate 1150 when the optical plate 1300 is fixed to the mounting substrate 1150. The optical plate 1300 may be fixed to the mounting substrate using a plurality of screws 1360. The plurality of screws 1360 are arranged within a corresponding plurality of through-holes 1365. The seal loop 1500 may be located within a recess (not shown) in the inner surface 1310 of the optical plate. The plurality of through-holes 1365 is located between a peripheral edge of the optical plate 1300 and the recess for the seal loop 1500.

A guiding hole 1340 is provided to the optical plate 1300. Another guiding hole 1140 is provided to the PCB 1110. The mounting of the optical plate 1300 to the substrate 1100 may be facilitated using the guiding hole 1340 and the another guiding hole 1140 for a precise positioning.

At least one electrical contact 1200 is provided to the top surface of the PCB 1110. The at least one electrical contact 1200 in the embodiment of FIG. 3 comprises a pair of electrical contacts located at a periphery of the PCB 1110.

The optical plate 1300 further comprises the at least one electrical connecting element 1400 integrated to the optical plate 1300. In the embodiment of FIG. 3, the at least one electrical connecting element 1400 comprises a pair of bare connecting elements, more specifically a pair of bare self-standing pins. The at least one electrical connecting element 1400 may be integrated to the optical plate 1300 by overmolding. The at least one electrical connecting element 1400 is configured for, when the optical plate 1300 is mounted over the PCB 1110, being connected electrically to the at least one electrical contact 1200, and for providing electrical connection through the optical plate 1300 between the inner surface 1310 and the outer surface 1320.

The outer surface 1320 of the optical plate comprises a lateral surface in FIG. 3 including a recess 1330. The recess 1330 surrounds the at least one electrical connecting element 1400 and is located at the periphery of the PCB 1110. The recess 1330 defines a receptacle configured for receiving a cooperating electrical connector 2000.

Further, in the embodiment of FIG. 3, the lighting unit 1000 comprises a seal 1335 arranged on the outer surface 1320 of the optical plate, and surrounding the recess 1330 such as to provide sealing at the interface between the electrical connector 2000 and the outer surface 1320 upon plugging the electrical connector 2000 to the recess 1330.

The at least one electrical connecting element 1400 extends such as to face a lateral surface of the outer surface 1320 in FIG. 3. Additionally, an extremity of the at least one electrical connecting element 1400 on the outer surface 1320 side extends substantially parallel to the substrate 1100. The at least one electrical connecting element 1400 may thus be configured for providing electrical connection at a periphery of the optical plate 1300 with respect to the outer surface 1320.

Furthermore, the recess 1330 is provided in FIG. 3 with a retaining means (not shown) configured for retaining the electrical connector 2000 in electrical connection with the at least one electrical connecting element 1400. The retaining means of FIG. 3 is a mechanical retaining means configured for cooperating with a complementary mechanical retaining means of the electrical connector 2000. The retaining means is integrated to the optical plate 1300. More specifically, the electrical connector 2000 comprises a pair of snap-fit portions 2100 configured to cooperate with a corresponding pair of cavities on an external surface defining the recess 1330. Additionally, guiding elements 1331 extending parallel to each side of the recess 1330 allow guiding the electrical connector 2000 when plugging it to the recess 1330.

The pair of snap-fit portions 2100 extends on either side of the electrical connector 2000 as wings including each a hook-like protuberances at the extremities of it such as to latch to cooperating features of the retaining means. The recess 1330 in the embodiment of FIG. 3 presents itself as a cavity located within a parallelepiped portion of material at a periphery of the optical plate 1300. One side of this parallelepiped portion of material is attached to the rest of the optical plate, one side is open and allows access to the at least one electrical connecting element 1400, and the remaining sides are closed. The open side faces the periphery of the optical plate 1300 in order to facilitate access for external connection. The pair of guiding elements 1331 each extend parallel to sides of the parallelepiped portion of material, perpendicularly with respect to the open side.

Figure 5:
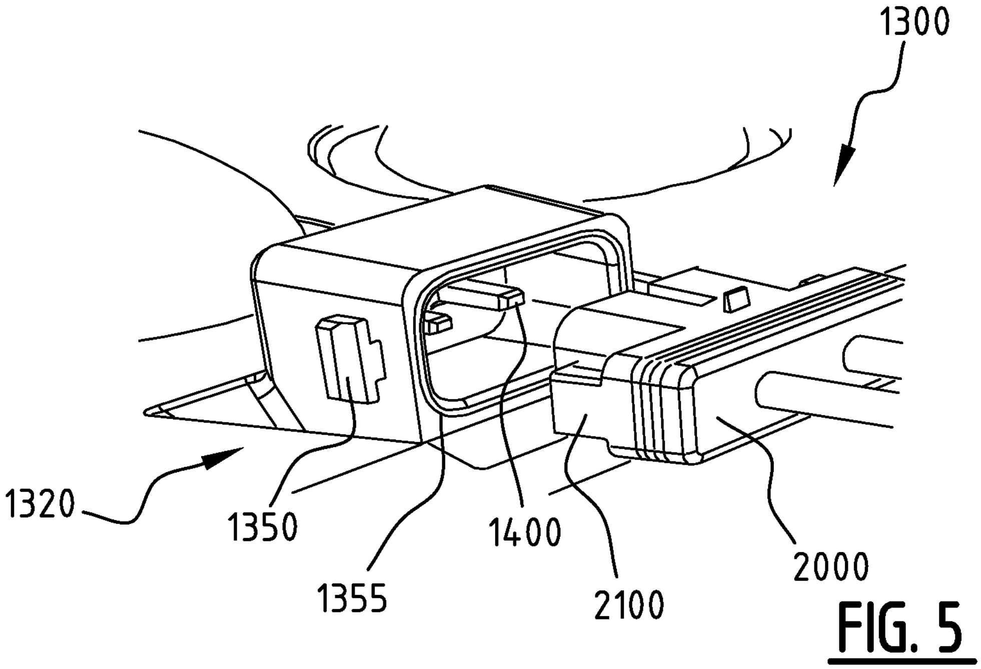
FIG. 5 is a close-up view of a recess of another exemplary embodiment of a lighting unit.

FIG. 5 is a close-up view of a recess with similarities to the one described with respect to FIG. 3. The recess 1330 of FIG. 5 is provided to a lateral surface of the outer surface 1320, said lateral surface being located at a periphery of the optical plate and extending substantially perpendicularly relative to relative to the substrate (not shown). The recess 1330 of FIG. 5 is provided with a retaining means 1350 configured for retaining the electrical connector 2000 in electrical connection with the at least one electrical connecting element 1400. The electrical connector 2000 comprises a pair of snap-fit portions 2100 configured to cooperate with a corresponding pair of protuberances included in the retaining means 1350 on an external surface defining the recess 1330. A seal 1355 arranged on the outer surface 1320 of the optical plate and surrounding the recess 1330 provides sealing at the interface between the electrical connector 2000 and the outer surface 1320 upon plugging the electrical connector to the recess.

Figure 4:
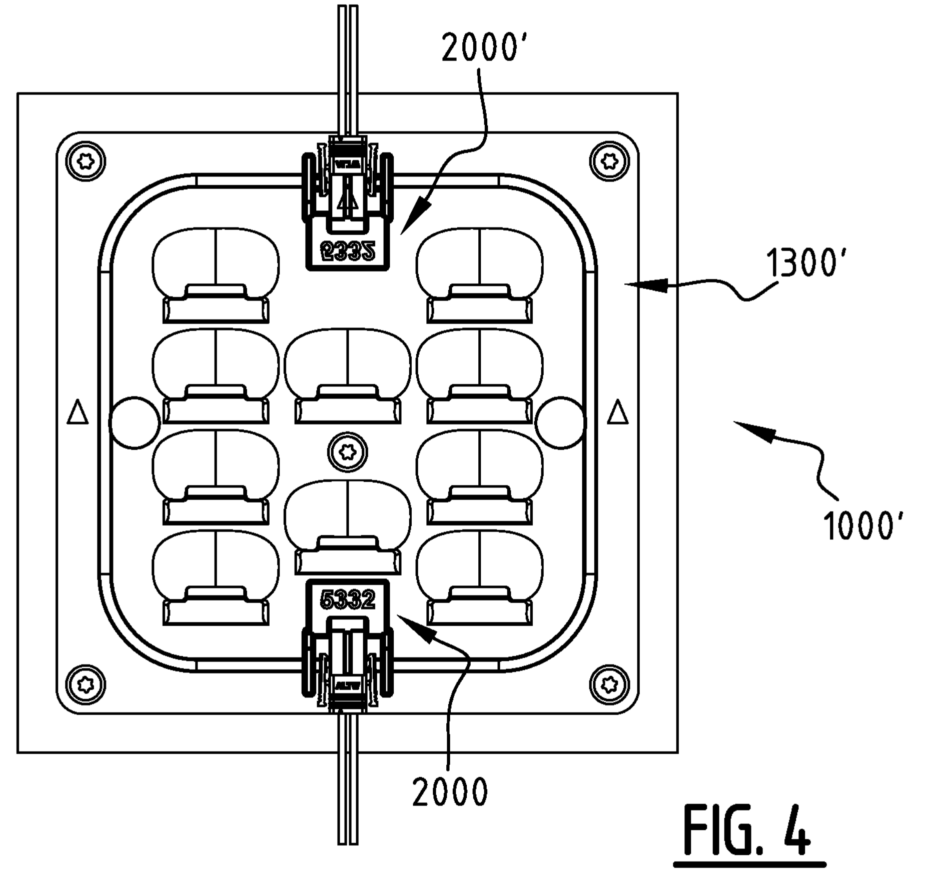
FIG. 4 shows a top view of still another exemplary embodiment of a lighting unit.

FIG. 4 shows a top view of still another exemplary embodiment of a lighting unit according to the present invention.

The lighting unit 1000' of FIG. 4 is similar to the one described with reference to FIG. 3 apart relative to the following features. The central column of optical elements of the optical plate 1300' comprises one less optical element. Also the PCB (not shown) below the optical plate 1300' comprises one less LED in the central column.

A first electrical connector 2000 and a second electrical connector 2000' are provided to a plurality of electrical connecting elements. The first electrical connector 2000 of FIG. 4 may be similarly configured as the electrical connector of FIG. 3, as well as the corresponding at least one electrical contact, the at least one electrical connecting element, and the recess surrounding the at least one electrical connecting element. The second electrical connector 2000' of FIG. 4 may present similar configuration and corresponding features, but located oppositely to the first electrical connector 2000 relative to the optical plate 1300. The first and second electrical connectors 2000, 2000' may both be linked to two connecting lines for powering the one or more light sources.

The first electrical connector 2000 may provide power from a power supply. The second electrical connector 2000' may be used to interconnect the lighting unit 1000' to another lighting unit (not shown) and provide power to it. In another embodiment, the number of connecting lines may be different for the first and second electrical connectors. Additionally, or alternatively, the type of input/output, e.g. power input, power output, data input, data output, may be different for the first electrical connector 2000 and the second electrical connector 2000', and the destinations of the different inputs/outputs may also be different electronic components arranged on the substrate.

Whilst the principles of the invention have been set out above in connection with specific embodiments, it is to be understood that this description is merely made by way of example and not as a limitation of the scope of protection which is determined by the appended claims.

The invention claimed is:

1. A lighting unit comprising:

a substrate;

one or more light sources, preferably one or more LEDs, provided to a top surface of the substrate;

at least one electrical contact provided to the top surface of said substrate; and an optical plate having an inner surface and an outer surface, said optical plate comprising one or more optical elements, said one or more optical elements configured for cooperating with the one or more light sources, wherein the inner surface of the optical plate faces the top surface of the substrate, wherein the optical plate further comprises at least one electrical connecting element integrated to the optical plate, wherein the at least one electrical connecting element is configured for, when the optical plate is mounted over the substrate, being connected electrically to the at least one electrical contact, and for providing electrical connection through the optical plate between the inner surface and the outer surface, and wherein the outer surface of the optical plate comprises a recess surrounding a portion of the at least one electrical connecting element, said recess defining a receptacle configured for receiving an electrical connector.

2. The lighting unit according to claim 1, wherein the optical plate is configured for being mounted on the substrate such as to define at least one sealed cavity between the inner surface of the optical plate and the top surface of the substrate; and wherein the at least one electrical contact is in the at least one sealed cavity.

3. The lighting unit according to claim 2, wherein a seal is provided at an interface between the optical plate and the substrate and arranged around the at least one sealed cavity such as to seal the at least one sealed cavity.

4. The lighting unit according to claim 1, wherein one of said at least one electrical contact is electrically connected to the one or more light sources, preferably via one or more electrical traces provided to the substrate.

5. The lighting unit according to claim 1, wherein the outer surface of the optical plate comprises a lateral surface and an upper surface, and wherein the at least one electrical connecting element is configured for providing electrical connection between the inner surface and the lateral surface of the optical plate.

6. The lighting unit according to claim 1, wherein the at least one electrical contact comprises a spring portion and the at least one electrical connecting element comprises: at least one pad portion configured for being connected to the at least one electrical contact, and at least one self-standing portion, or wherein the at least one electrical contact comprises a spring portion or the at least one electrical connecting element comprises: at least one pad portion configured for being connected to the at least one electrical contact, and at least one self-standing portion.

7. The lighting unit according to claim 1, wherein the recess is provided with a retaining means configured for retaining the electrical connector in electrical connection with the at least one electrical connecting element, and wherein preferably the retaining means is integrated to the optical plate.

8. The lighting unit according to claim 1, further comprising a seal arranged on the outer surface of the optical plate and surrounding the recess such as to provide sealing at an interface between the electrical connector and the outer surface upon plugging the electrical connector to the recess.

9. The lighting unit according to claim 1, wherein the at least one connecting element is configured for providing electrical connection at a periphery of the optical plate with respect to the outer surface.

10. The lighting unit according to claim 1, wherein the at least one connecting element comprises at least two connecting lines, and wherein the at least two connecting lines comprises each a self-standing portion extending away from the outer surface.

11. The lighting unit according to claim 1, wherein an optical plate portion through which the at least one electrical connecting element passes is made of an electrically-insulating material, and wherein preferably a bare conducting portion of the at least one connecting element is directly embedded within the optical plate portion.

12. The lighting unit according to claim 1, wherein the at least one electrical connecting element is integrated to the optical plate by overmolding.

13. The lighting unit according to claim 1, wherein the one or more optical elements comprises one or more lens elements, preferably one or more free-form lens elements.

14. The lighting unit according to claim 1, wherein the one or more optical elements are forming an array of at least two rows and at least two columns and the one or more light sources are forming an array of at least two rows and at least two columns, or wherein the one or more optical elements are forming an array of at least two rows and at least two columns or the one or more light sources are forming an array of at least two rows and at least two columns.

15. The lighting unit according to claim 1, wherein each of the one or more optical elements is configured to correspond to one light source of the one or more light sources.

16. An optical plate having an inner surface and an outer surface, said optical plate comprising one or more optical elements, said one or more optical elements configured for cooperating with one or more light sources provided to a substrate, wherein an inner surface of the optical plate is configured for facing a top surface of the substrate, wherein the optical plate further comprises at least one electrical connecting element integrated to the optical plate, wherein the at least one electrical connecting element is configured for, when the optical plate is mounted over the substrate, being connected electrically to at least one electrical contact of the top surface of the substrate, and for providing electrical connection through the optical plate between the inner surface and the outer surface, and wherein the outer surface of the optical plate comprises a recess surrounding a portion of the at least one electrical connecting element, said recess defining a receptacle configured for receiving an electrical connector.

17. The optical plate according to claim 16, wherein the recess is provided with a retaining means configured for retaining the electrical connector in electrical connection with the at least one electrical connecting element, and wherein preferably the retaining means is integrated to the optical plate.

18. The optical plate according to claim 16, further comprising a seal arranged on the outer surface of the optical plate and surrounding the recess such as to provide sealing at the interface between the electrical connector and the outer surface upon plugging the electrical connector to the recess.

19. A lighting unit comprising:

a substrate;

one or more light sources, preferably one or more LEDs, provided to a top surface of the substrate;

at least one electrical contact provided to the top surface of said substrate; and an optical plate having an inner surface and an outer surface, said optical plate comprising one or more optical elements, said one or more optical elements configured for cooperating with the one or more light sources, wherein the inner surface of the optical plate faces the top surface of the substrate, wherein the optical plate further comprises at least one electrical connecting element integrated to the optical plate, wherein the at least one electrical connecting element is integrated to the optical plate by overmolding, and wherein the at least one electrical connecting element is configured for, when the optical plate is mounted over the substrate, being connected electrically to the at least one electrical contact, and for providing electrical connection through the optical plate between the inner surface and the outer surface.

* * * * *